Patented Jan. 1, 1924.

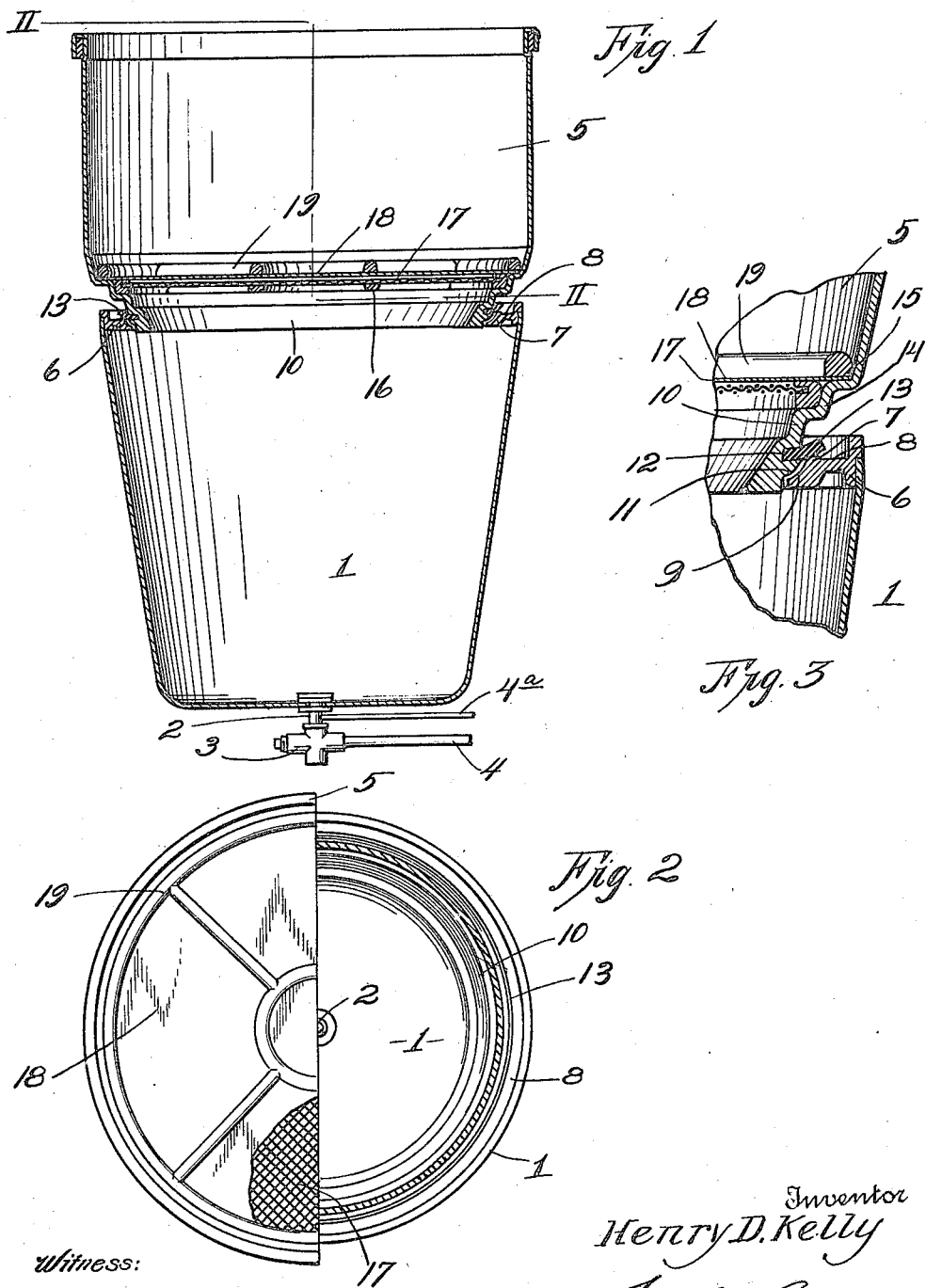

1,479,245

UNITED STATES PATENT OFFICE.

HENRY D. KELLY, OF KANSAS CITY, MISSOURI.

SEAL FOR VACUUM COFFEE URNS.

Application filed April 4, 1921, Serial No. 458,601. Renewed March 12, 1923.

*To all whom it may concern:*

Be it known that I, HENRY D. KELLY, a citizen of the United States, and resident of Kansas City, county of Jackson, State of Missouri, have invented a certain new and useful Improvement in Seals for Vacuum Coffee Urns, of which the following is a complete specification.

This invention relates to coffee urns and more particularly to automatic means for forming an air-tight joint between the beverage jar and the leacher bucket as used in making coffee by the vacuum system.

Heretofore, it has been customary to make the mouth of the beverage jar and the lower edge of the leacher bucket of substantially the same diameter, and to provide a relatively non-compressible gasket for sealing the joint between the two members by means of some clamping mechanism whereby pressure can be brought on the gasket through the lower edge of the leacher bucket. It has been found in practice, however, that this method of forming an air-tight joint was more or less impracticable as the operators will fail to apply the necessary force to clamp the gasket tightly, or coffee grounds or other obstructions will impede the perfect sealing of the joint, thus forming a leak through which air will be drawn when the vacuum is started in the beverage jar. It has also been found that when an air-tight connection is formed between two members as set forth above, that the ordinary gasket will most invariably "freeze" or stick in position and it is difficult to remove the leacher bucket from position over the beverage jar.

My prime object is to produce a gasket of such character that the weight of the leacher bucket and contents alone will automatically form an air-tight joint between the bucket and beverage jar.

Another object is to produce a construction of such character that there will be no danger of the "freezing" or sticking of the gasket and making it difficult to remove the leacher bucket.

A further object is to produce a gasket of such character that it shall be protected by abutment of unyielding parts of the urn and bucket before the gasket can be subjected to injurious pressure, such as might be imposed, for instance, by an attendant dropping the leacher bucket forcibly in place or pressing down upon the same when in place.

A still further object is to produce a device of this character of strong, simple, durable, efficient and inexpensive construction; and in order that it may be fully understood, reference is to be had to the accompanying drawing, in which:

Figure 1 is a central vertical section taken through a leacher bucket and beverage jar embodying the invention.

Figure 2 is a section on the line II—II of Figure 1.

Figure 3 is an enlarged fragmentary section corresponding to Figure 1.

In the said drawing, where like reference characters identify corresponding parts in all of the figures, 1 is a beverage jar within which the vacuum is produced in the making of coffee, 2 is an outlet for the coffee at the bottom of the beverage jar and 3 a valve for controlling said outlet through the pipe 4. Adapted to rest upon the beverage jar is a leacher bucket 5.

The beverage jar is provided along its upper edge with an inwardly projecting circular flange 6, the margin of its inner edge being formed with an upwardly facing bead 7 adapted to act as an abutment for a gasket as will hereinafter appear, and between said bead 7 and the outer edge of flange 6 is a shallow channel 8 within which coffee grounds or other obstructions will be forced off the bead 7 and thus leave said bead free for a close and air-tight engagement by the gasket. By reference to Figure 3, it will be noted that flange 6 is also formed with a downwardly converging or inclined face 9 for abutment with an overlying portion of the leacher bucket.

The leacher bucket is of stepped formation 10 at its lower edge, as shown most clearly in Figure 3, and is adapted to overlie and fit within the circular flange 6. Near its lower extremity the portion 10 is provided externally with an inclined face 11 normally overlying and spaced from the inclined face 9, and just above face 11, the portion 10 is provided with an annular groove 12 in which a resilient, compressible gasket 13 is compressed, and from which it projects so that it shall be adapted to find abutment on bead 7 of flange 6, the weight of the leacher bucket and contents being such as to slightly bow the gasket, it being readily understood that any particles of coffee which might be resting on said bead will be pushed therefrom into the channel 8. When the bucket is in operative position, as shown, it will be noticed that the space between the overlapping faces 9 and 11 is such that they will come into contact before it is possible for the gasket to be injured by cramping between the bead 7 and slot 12, and, therefore, such pressure will not tend to cut off or injure the gasket.

Above the groove 12 of flange 10, said last-named member is provided with a shoulder 14 upon which is adapted to rest a spider 16 to act as a support for a screen 17. A second shoulder 15 is formed above shoulder 14, and resting on said shoulder 15 and the screen 17 is a paper filter disk 18, upon which rests a second spider or weight ring 19 to hold the paper filter disk 18 in place and to prevent any buckling or injury to said disk. It will be understood that the construction just described forms no part of the present invention.

It will be understood that with the gasket construction of the invention, the life of the gasket is practically indefinite as it will be impossible for an excess amount of pressure to be brought to bear upon the gasket, due to the fact that the flanges of the two members, the leacher bucket and the beverage jar, will always come into abutment, as hereinbefore explained, before it is possible for any injurious application of the pressure on the gasket.

It will be apparent that due to the character of contact or engagement between the gasket and the bead, it is impossible for said parts to in effect "freeze" together and hence the bucket can always be easily lifted from position, and it will also be apparent that due to the yielding of the gasket under pressure, an unequal pressure upon the bucket, such as might be imposed by the operator placing something on one edge thereof or pressing with his hand on one edge thereof, and slightly tilting or rocking the bucket, will not break the seal between the gasket and bead and thus impair, even temporarily, the vacuum.

From the above description it will be apparent that I have produced a device of the character described, which possesses all of the features of advantage set forth as desirable, and while I have described and claimed the preferred embodiment of the same, I reserve the right to make all changes properly falling within the spirit and scope of the appended claims.

I claim:—

1. The combination of a beverage jar, a leacher bucket, a gasket interposed between the jar and bucket and resiliently supporting the latter; said jar and bucket having overlapping spaced portions adapted for contact when excessive weight is imposed on said leacher bucket.

2. The combination of a beverage jar provided with a circumferential flange at its upper end and a leacher bucket provided with a circumferential flange at its lower end for support on said jar; said members being adapted to stand in overlapping relation, and an annular gasket secured to one of the members and finding abutment against the other and constituting an airtight seal between them; the circumferential flanges of said jar and bucket being adapted for engagement to prevent the imposition of undue weight on said gasket.

3. The combination of a beverage jar provided with an upwardly projecting bead, a leacher bucket adapted to be supported by said beverage jar, an annular gasket secured to said leacher bucket and projecting outwardly therefrom and adapted to find abutment on the bead of the beverage jar.

4. The combination of a beverage jar provided with an inwardly projecting flange having an upwardly projecting bead and a downwardly and inwardly inclined face inward and below the plane of said bead, a leacher bucket adapted to be supported by said beverage jar and having a circumferential flange formed with a downwardly and inwardly sloping face, and an outwardly projecting gasket secured near the lower end of said flange above the plane of said sloping face and adapted to find abutment on the bead of said beverage jar; the downwardly and inwardly sloping faces of said beverage jar and leacher bucket being adapted to abut each other when excessive weight is imposed on said gasket.

In witness whereof I hereunto affix my signature.

HENRY D. KELLY.